Jan. 1, 1935.  A. D. PASCHOS  1,986,011

TWIN SALT AND PEPPER SHAKER

Filed March 6, 1934

INVENTOR.
Antonios D. Paschos
BY Myron J. Dikrman
ATTORNEY.

Patented Jan. 1, 1935

1,986,011

UNITED STATES PATENT OFFICE 1,986,011

TWIN SALT AND PEPPER SHAKER

Antonios D. Paschos, Detroit, Mich.

Application March 6, 1934, Serial No. 714,291

2 Claims. (Cl. 65—45)

The object of my invention is to produce a duplex seasoning container for retaining different kinds of powdered seasoning ingredients, capable of being functioned to discharge the powdered seasonings from either chosen chamber to the exclusion of the other, and at the will of the operator or user.

Another object is to produce a twin chamber, powdered seasoning container, adapted for both table and kitchen use, and that may be functioned separately or jointly, as desired, for cooking and seasoning purposes.

A further object is to provide a duplex seasoning container, especially adapted for salt and pepper seasonings, having separated compartments for each ingredient, each compartment being provided with wall perforations at a chosen location for discharging the respective ingredients therethrough.

A still further object is to provide a twin salt and pepper shaker that is simple in construction, easily and efficiently operated and that can be manufactured at a very low cost.

These several objects are attained in the preferred form by the construction and arrangement of parts more fully hereinafter set forth.

Similar parts on the drawing are marked by similar numerals or letters.

In general, my device comprises a container suitable for table or kitchen use, and formed with bulged wall sections and with two separated compartments therein, preferably about the size of the ordinary salt shaker having a partition wall located centrally, lengthwise therethrough, each compartment being provided with means for entering powdered seasoning ingredients therein, and wall perforations for discharging same therefrom.

Figure 2:
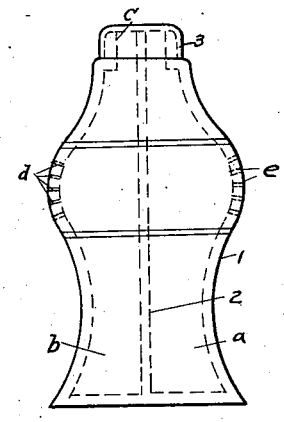
Fig. 2 is a side view of the container shown in the Fig. 1, showing the set of wall perforations entering in the container chamber on that side.
Figure 1:
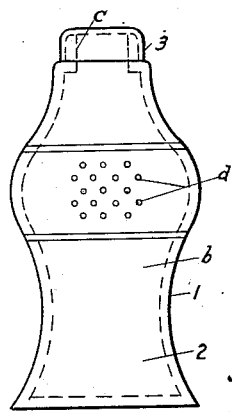
Fig. 1 is an elevation of a preferred type of twin shaker showing the arrangement of the separated compartments and wall shaker perforations.
Figure 3:
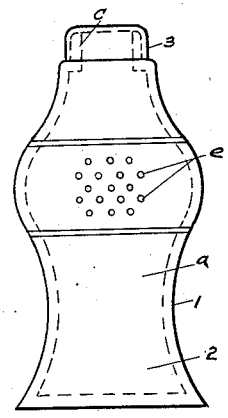
Fig. 3 is a side view of the same container showing the opposite side wall and another set of wall perforations entering into the opposite container chamber.

I will now describe more fully the detail construction of my device, referring to the drawing and the marks thereon, referring more specifically to the preferred type of container as illustrated in the Figs. 1 to 3 of the drawing, and with the remaining illustrations in the Figs. 4 to 8 as modifications thereof.

Figure 4:
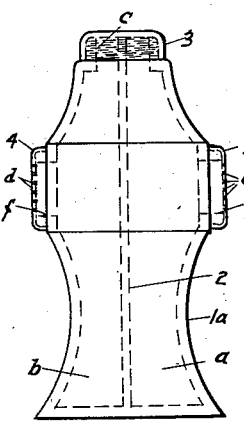
Fig. 4 is an elevation of a similar duplex container as shown in Fig. 1, modified by the use of perforated wall caps instead of the wall perforations as shown in the previous case.

The container 1 may be made of any suitable material such as porcelain, glass, or metal, or any other suitable material that may be adapted to moulding or shaping to desired container designs. The Fig. 1 illustrates one form of design for the container exterior walls showing a bulged center section and wall closing means, although it may be modified to any other exterior design or arrangement desired with the body bulge at different locations. The size and shape may also be varied to best meet the purpose for which my device is to be used, and preferably small and slender body structure for table use, or larger container body for kitchen or culinary use. The container 1, of any exterior design, is formed in an elongated, hollow body structure, preferably of circular cross-sections as usually provided for the ordinary salt or pepper shaker, and provided with an open top end c. A centrally positioned partition wall 2 is formed across the chamber recess, extending the full length thereof, being integral with both container bottom and side walls, dividing same into two separated compartments a and b, completely separated from each other, said partition wall 2 being extended flush with the container walls of the open end c. Over the open container end c is fitted a demountable closing end cap 3, tightly fitted thereon and fixedly attached either by thread means or by a tight press fit over the container end, the inner surface of the end cap 3 being designed to engage and fit both container side walls and partition wall 2, for completely sealing the separated compartments from each other. Through opposite side walls of the container 1, in the center bulge section opposite the intervening partition wall 2, and slightly above the container center cross section, are formed series of fine or small perforations d and e, preferably formed through the wall structure, one series of perforations being made of finer or smaller holes than the other, the exact size of both series being pre-determined depending upon the character of powdered seasoning ingredient with which it is to be used. The exact position or location of either of the series of wall perforations may be determined as desired, although in all cases each series of perforations either d or e, must remain opening into their respective compartments a or b only. By removing the end cap 3 from the container open end c, different powdered or granulated seasoning ingredients may be inserted into the respective separated compartments a or b, partially filling same to a level below their respective wall perforations and the end cap 3 replaced thereon, completely sealing and separating said compartments and their respective ingredients. By tilting the container 1 with the perforations of the compartment containing the seasoning desired, and shaking the container slightly, each of the seasoning ingredients may be discharged through their respective wall perforations, independently of each other, or when placed in an inverted position and a reciprocating motion applied thereto, both compartments will function to discharge their respective seasonings concurrently, and in proportions predetermined by the size of the respective perforation openings in either the series d or e.

Where the material used may require, or in cases of some desired design, the wall perforations may be replaced by special wall caps 4 and 5, fixedly mounted on open, side wall neck projections f, as illustrated on the container body 1a of the Fig. 4. The caps 4 and 5 are likewise provided with a series of wall perforations d and e as in the former case. The remaining part of the container construction, and the operation is exactly the same as previously described for the Figs. 1 to 3. The application of the perforated wall caps, similar to the caps 4 and 5 may also be applied, if desired, to any other design herein referred to, in place of wall perforations illustrated therein. The function is the same in either case.

Figure 5:
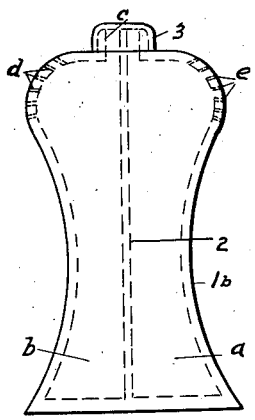
Fig. 5 is an elevation of a modified twin container showing the separated compartment wall perforations at the container top.

The Fig. 5 shows a further modification of my duplex container, the body section 1b illustrating one of the many different exterior wall designs as may be made, said container being provided with like partition wall 2 as in the former cases, forming separated compartments a and b, but having the respective series of wall perforations d and e positioned in the top bulged section corners of the container walls, but each series of wall perforations opening in its respective compartment only, as in the former case. This arrangement of position of said wall perforations greatly facilitates the functioning of both compartments a and b simultaneously when desired, or they may be operated separately if desired, by holding said container in the proper positions. The remaining parts of the container construction and its operation is the same as in the former case.

Figure 6:
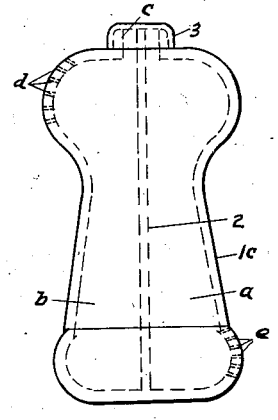
Fig. 6 is an elevation of a further modification of a double compartment container showing the discharge wall perforations as may be located at opposite ends thereof.

The Fig. 6 illustrates a modification of the container shown in the Fig. 5, showing a differently formed container body section 1c, and having the different series of wall perforations d and e located at opposite compartment end bulged sections, one series e being positioned near the bottom of the compartment a instead of the top corner shown in the previous case. The advantage of this arrangement of wall perforations, being that one of said series of perforations may be completely covered by the hand, or otherwise, while operating the opposite series, but both series may be functioned jointly as in the former case by applying a slight oscillating movement to the container. The remaining parts and container construction is the same as described for the previous Fig. 5.

Figure 7:
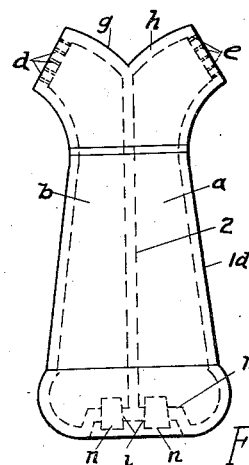
Fig. 7 is another elevation of a modified form of duplex container with both chamber wall perforations at the same end, capable of discharging either jointly or severally.

The Fig. 7 shows another modification of the Fig. 5, illustrating another modification of exterior formation of the container body 1d, but having the container neck c and closing end cap 3 omitted, the top container end being bulged V-shaped forming the extended neck sections g and h, each being a curved extension of the container compartments b and a respectively, each being closed at the end thereof and provided with similar series of wall perforations d and e as in the former cases. Compartment openings k are formed in the bottom container wall m opening into the respective compartments a and b, designed for inserting powdered or pulverized seasoning ingredients therein, and the respective openings k are closed and sealed by the small cork plugs n tightly pressed therein. The remaining construction and operation is the same as in the previously described Fig. 5.

Figure 8:
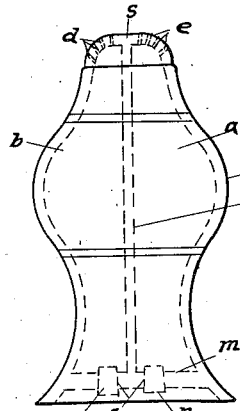
Fig. 8 is another elevation of a still further modification of the type illustrated in the Fig. 7, showing both compartment wall perforations in the same end, adapted for functioning jointly, but controlled by predetermined size of wall perforations.

The Fig. 8 is a further modification of the design as illustrated in the Fig. 7, but formed with a rounded top end s, made integral with the container and partition walls, and contains therein both series of wall perforations d and e, each series opening into its respective compartment a or b as in the former case. The remaining construction is the same as described for the Fig. 7, but these separated compartments a and b cannot be functioned independently of each other as in the former case. A joint discharge of powdered seasoning ingredients will always result when inverted and a reciprocating movement applied thereto. The proportions of ingredients so discharged may be governed by pre-determined sizes of the wall perforations as in the former cases, this type being especially adapted for culinary purposes where two ingredients are always required.

While I have described my invention as applied to powdered or granulated seasoning ingredients, especially adapted for salt and pepper, for table or culinary purposes, it may be adapted equally as well to dispensing any other powdered or pulverized ingredients, or the container may be used for dispensing seasoning oils or liquids in the same manner as heretofore described.

It is apparent that my duplex seasoner dispensing container is subject to various modifications in both general design and construction details without departing from the spirit of my invention, and I claim not only the structures herein illustrated, but any modification thereof that is substantially a substitution of parts shown.

Having fully described my twin salt and pepper shaker, what I claim as my invention and desire to secure by Letters Patent is:

1. A duplex dispensing container adapted for retaining and discharging two different kinds of seasoning ingredients and used in combination therewith, comprising a hollow, elongated bulged body section formed with an open tubular neck section at the top end thereof, a detachable closing cap mounted over the open neck end, said container being separated into two compartments by a centrally positioned partition wall extended the full length of said container body and neck section and made integral therewith, different series of wall perforations provided on opposite sides of the container body bulge section, each series positioned opposite the partition wall.

2. A duplex dispensing container adapted for containing or discharging two different kinds of seasoning ingredients therefrom and used in combination therewith, comprising a hollow, elongated bulged body section formed with a single circular neck opening and provided with a detachable closing means for said neck opening, said container being separated in two compartments by a centrally positioned partition wall extended the entire length of said body and neck, open tubular wall neck sections formed in the bulge at opposite sides of the container body, each of said last mentioned neck sections positioned opposite the partition wall, and a perforated closing cap mounted over the open end of each of said tubular wall necks.

ANTONIOS D. PASCHOS.